(12) United States Patent
Zhao et al.

(10) Patent No.: US 12,042,885 B1
(45) Date of Patent: Jul. 23, 2024

(54) ALUMINUM ALLOY FLUX-CORED WELDING WIRE AND FABRICATION METHOD THEREOF

(71) Applicant: JIANGSU UNIVERSITY, Zhenjiang (CN)

(72) Inventors: Yutao Zhao, Zhenjiang (CN); Chang Miao, Zhenjiang (CN); Xizhou Kai, Zhenjiang (CN); Chengchao Du, Zhenjiang (CN); Rui Cao, Zhenjiang (CN); Zhuangzhuang Xu, Zhenjiang (CN)

(73) Assignee: JIANGSU UNIVERSITY, Zhenjiang (CN)

( * ) Notice: Subject to any disclaimer, the term of this patent is extended or adjusted under 35 U.S.C. 154(b) by 0 days.

(21) Appl. No.: 18/008,455

(22) PCT Filed: Feb. 10, 2022

(86) PCT No.: PCT/CN2022/075863
§ 371 (c)(1),
(2) Date: Dec. 6, 2022

(87) PCT Pub. No.: WO2023/005188
PCT Pub. Date: Feb. 2, 2023

(30) Foreign Application Priority Data

Jul. 30, 2021 (CN) .......................... 202110873399.4

(51) Int. Cl.
*B23K 35/02* (2006.01)
*B23K 35/28* (2006.01)
*B23K 35/36* (2006.01)
*B23K 35/40* (2006.01)

(52) U.S. Cl.
CPC ........ *B23K 35/0266* (2013.01); *B23K 35/286* (2013.01); *B23K 35/3601* (2013.01); *B23K 35/406* (2013.01)

(58) Field of Classification Search
None
See application file for complete search history.

(56) References Cited

U.S. PATENT DOCUMENTS 5,781,846 A * 7/1998 Jossick .............. B23K 35/0227
428/560

FOREIGN PATENT DOCUMENTS

| | | |
|---|---|---|
| CN | 107042369 A | 8/2017 |
| CN | 111015013 A | 4/2020 |
| CN | 112775584 A | 5/2021 |
| CN | 113579556 A | 11/2021 |
| JP | 2008068290 A | 3/2008 |
| JP | 2013163196 A | 8/2013 |

\* cited by examiner

*Primary Examiner* — Alexandra M Moore
(74) *Attorney, Agent, or Firm* — Bayramoglu Law Offices LLC

(57) ABSTRACT

An aluminum alloy flux-cored welding wire and a fabrication method thereof are provided. In the present disclosure, a mixed salt is used as a filler for the flux-cored welding wire, and a reaction between the mixed salt and a welding base metal is directly induced through welding heat to produce in situ nanoparticles, which not only reduces a production cost of the welding wire, but also enhances the bonding between the added particles and the base metal through the prominent wettability between the in-situ enhancement particles and the base metal; and a rare earth element is added to significantly refine grains, which provides a new idea for the selection of a flux-cored welding wire for 7XXX aluminum alloy welding.

10 Claims, 3 Drawing Sheets

ALUMINUM ALLOY FLUX-CORED WELDING WIRE AND FABRICATION METHOD THEREOF

CROSS REFERENCE TO THE RELATED APPLICATIONS

This application is the national phase entry of International Application No. PCT/CN2022/075863, filed on Feb. 10, 2022, which is based upon and claims priority to Chinese Patent Application No. 202110873399.4, filed on Jul. 30, 2021, the entire contents of which are incorporated herein by reference.

TECHNICAL FIELD

The present disclosure belongs to the technical field of aluminum alloy flux-cored welding wires, and relates to an aluminum alloy flux-cored welding wire and a fabrication method thereof, and particularly to a flux-cored welding wire filled with a mixed salt and a rare earth for 7XXX aluminum alloy welding, and a fabrication method thereof.

BACKGROUND

Aluminum is the most abundant metal element in the earth's crust. With the continuous improvement of productivity, aluminum alloy has become the most widely used material other than steel. In recent years, aluminum alloy has been widely used in fields such as aerospace, military, rail vehicles, and pressure vessels due to their advantages such as low density, low melting temperature, prominent thermal conductivity and plasticity, and low cost. 7XXX series aluminum alloys are ultra-high strength heat-treatable aluminum alloys, and are widely used in the aerospace field. For example, the 7085 aluminum alloy is used in wing beams and ribs of large aircraft such as A380, Boeing, and Airbus; and the 7N01 aluminum alloy is widely used in the high-speed rail field.

Since aluminum alloy components are increasingly large and complicated, it is urgent to solve the connection problem of aluminum alloys. Welding, an efficient connection manner, has advantages such as convenient operation, strong adaptability, and low cost, but its use in industrial production still faces many challenges, such as severe welding hot cracking tendency, coarse weld grains, and weld mechanical performance softening. For example, when the 7N01 aluminum alloy is subjected to laser welding, a tensile strength of a welded joint drops by about 110 MPa; and when the 7075 aluminum alloy is subjected to tungsten inert gas (TIG) welding, there are obvious hot cracks on a weld surface. Therefore, as weak points of a component, aluminum alloy welds severely restrict the application of aluminum alloys. Studies have shown that, when particles are added to a welding material to reduce macroscopic weld cracks, dendrites in welds undergo equiaxed crystallization to effectively refine grains, and the strength attenuation is also significantly improved.

Chinese patent CN11015013A discloses a micro- and nano-particle-reinforced flux-cored welding wire for 2A12 high-strength aluminum alloy welding, where micro- and nano-particles such as TiC, TIN, SiC, and ZrC are introduced into a flux-cored welding wire to inhibit the grain growth in a weld zone and a fusion zone and achieve the dislocation locking, thereby improving a strength of a welded joint; and a strain induced by solidification is compensated by refining a second phase and dendrites, thereby reducing the hot cracking tendency.

However, in the fabrication of the above welding materials, micro- and nano-reinforcement particles have a too-high cost, and the wettability between the additional reinforcement particles and a matrix is poor, which leads to a decrease in a bonding strength between a bonding matrix and an interface and limits the production application of the above welding materials.

SUMMARY

The present disclosure designs and fabricates a flux-cored welding wire filled with a mixed salt and a rare earth for 7XXX aluminum alloy welding through organic combination of the flux-cored welding wire technology and the in-situ nano-particle enhancement mechanism, which is intended to solve problems such as severe cracking tendency, alloy element burning loss, coarse grains, and serious joint performance degradation when a solid-cored welding wire is used for 7XXX aluminum alloy welding. With the aluminum alloy flux-cored welding wire designed and fabricated by the present disclosure, a proportion of the mixed salt in the formula of the flux-cored welding wire can be adjusted to increase an adjustment range of an aluminum alloy weld composition, realize the optimization of the structure and performance of a 7XXX aluminum alloy weld, and improve a strength of a welded joint. The flux-cored welding wire of the present disclosure can significantly reduce a hot cracking tendency of a weld metal while ensuring that the chemical composition, mechanical performance, and corrosion resistance of the weld metal meet relevant requirements, thereby leading to a welded joint with beautiful appearance, high strength, and excellent performance.

In the present disclosure, a mixed salt is used as a filler for the flux-cored welding wire, and a reaction between the mixed salt and a welding base metal is directly induced through welding heat to produce in situ nanoparticles, which not only reduces a production cost of the welding wire, but also enhances the bonding between the added particles and the base metal through the prominent wettability between the in-situ enhancement particles and the base metal; and a rare earth element is added to significantly refine grains, which provides a new idea for the selection of a flux-cored welding wire for 7XXX aluminum alloy welding and is also an innovation point of the present disclosure.

The present disclosure is implemented by the following technical solutions. A flux-cored welding wire filled with a mixed salt and a rare earth for 7XXX aluminum alloy welding is provided, where a 1070 semi-hard pure aluminum strip is used as a sheath, the welding wire has a filling rate of 20% to 30%, that is, the welding wire includes a flux powder with a mass of 20% to 30% based on a mass of the flux-cored welding wire, and the flux powder is prepared from the following components in mass percentage: metal Zn powder: 4.5% to 8.0%, metal Mg powder: 1.2% to 3.5%, metal Cu powder: 0.5% to 2.5%, metal Mn powder: 0.04% to 0.5%, mixed salt powder: 5% to 30%, rare earth powder: 0.1% to 1.0%, and pure aluminum powder: the balance, based on 100% of a total mass percentage of the flux powder.

The mixed salt powder includes $K_2ZrF_6$ and $KBF_4$, which are both white powders; the mixed salt powder is ground to 200 meshes before being used; and the $K_2ZrF_6$ and $KBF_4$ are added in a mass ratio of (0.86-1.12):1.

The rare earth powder is Sc, Er, a composite additive of Sc and Zr, or a composite additive of Er and Zr. The Sc or Er is added alone, or the Sc and Zr are added in combination according to a mass ratio of 2:1, or the Er and Zr are added in combination according to a mass ratio of 2:1. The rare earth powder has a spherical or nearly-spherical morphology, a high purity, and a particle size of 150 μm to 250 μm; Sc and Er each have a mass purity of 99.9% to 99.99%, and Zr has a mass purity of 99.5% to 99.8%; and Sc, Er, and Zr each have an oxygen content of lower than 50 ppm.

A total addition amount of the Zn powder, the Mg powder, the Cu powder, and the Mn powder matches an addition amount of a welding base metal, and the total addition amount varies according to different addition amounts of the welding base metal; and in consideration of burning losses of elements, Cu and Mn are added at contents 1.1 to 1.3 times standard Cu and Mn contents in a base metal grade; and Zn and Mg are added at contents 1.3 to 1.5 times standard Zn and Mg contents in the base metal grade.

Preferably, the mixed salt powder is preferably added in a weight percentage of 14% to 17%, where a mass ratio of $K_2ZrF_6$ to $KBF_4$ is preferably 0.94:1.

Preferably, the rare earth Sc powder is preferably added alone in a weight percentage of 0.4% to 0.7%, and the rare earth Er powder is preferably added alone in a weight percentage of 0.3% to 0.6%; and when a Sc/Zr composite rare earth powder or a Er/Zr composite rare earth powder is added, Sc or Er is preferably added in a weight percentage of 0.3%, and Zr is preferably added in a weight percentage of 0.2%.

The Zn powder, the Mg powder, the Cu powder, and the Mn powder each are a high-purity metal powder with a mass purity of greater than 99.9%; the high-purity metal powder has a spherical or nearly-spherical morphology, a particle size of 150 μm to 250 μm, and an oxygen content of lower than 50 ppm.

In the flux-cored welding wire filled with a mixed salt and a rare earth for 7XXX aluminum alloy welding, the sheath is a 1070 semi-hard pure aluminum strip with a mass purity of higher than 99.5%. The flux-cored welding wire of the present disclosure is fabricated by a conventional flux-cored welding wire forming technology.

A fabrication method of the flux-cored welding wire filled with a mixed salt and a rare earth for 7XXX aluminum alloy welding is provided, including:

selecting a 1070 semi-hard pure aluminum strip with a width of 10 mm to 16 mm and a thickness of 0.6 mm to 1.0 mm as a sheath for a filling wire, removing an oxide film on an upper surface of the pure aluminum strip with a scraper, and rolling the pure aluminum strip into a U-shaped channel; and filling the flux powder thoroughly mixed into the U-shaped channel, closing the U-shaped channel, passing a product through drawing dies with different diameters successively for multi-drawing and tube reducing, and cleaning a surface of a resulting welding wire to obtain a finished welding wire product with a diameter of 0.8 mm to 3.0 mm, where a weight of the flux powder is 20% to 30% of a weight of the welding wire.

The present disclosure also provides a use of the flux-cored welding wire filled with a mixed salt and a rare earth for 7XXX aluminum alloy welding in the 7XXX aluminum alloy welding, where the 7XXX aluminum alloy welding includes, but is not limited to, tungsten argon arc welding and gas metal arc welding (GMAW); during the welding, the welding wire is placed in a gap or groove between two plates to be connected, and high-purity argon with a purity of higher than 99.9% is used as a protective gas; and after the welding, a steel wire brush or a copper wire brush is used to remove a welding spatter on a surface.

The components of the flux-cored welding wire and functions thereof are as follows:

Mg: which helps to improve a hardness of a weld without significantly reducing the plasticity;

Zn: which forms a $MgZn_2$ phase with Mg to play a dispersion-strengthening role, thereby significantly strengthening the alloy;

Mn: which plays a microalloying, strengthening, and toughening role to reduce the corrosion susceptibility of a weld, especially improves the stress, corrosion, and cracking resistance;

Cu: which plays a solid-solution strengthening role to improve the mechanical performance of the alloy;

rare-earth metals: which promote the heterogeneous nucleation and grain refinement, and tend to promote the production of a stable compound from hydrogen to inhibit the generation of hydrogen pores;

Zr: which reacts with the rare earths to produce a secondary phase with a double-layer structure, thereby playing a dispersion-strengthening role to improve a strength of a weld; and mixed salt powder: which has the following action mechanism:

the following metallurgical chemical reactions proceed in a Al—Zr—B ternary system:

$$[Zr]+3Al \rightarrow Al_3Zr \quad (1)$$

$$2[B]+A \rightarrow AlB_2 \quad (2)$$

$$Al_3Zr+AlB_2 \rightarrow ZrB_2+4Al \quad (3)$$

an overall reaction equation is as follows:

$$3K_2ZrF_6+6KBF_4+10Al=3ZrB_2+9KAlF_4+K_3AlF_6 \quad (4)$$

A calculation formula of the standard free energy of formation is as follows: $\Delta G_T^\ominus = \Delta H_T^\ominus - T\Delta S_T^\ominus$, where when $\Delta G_T^\ominus < 0$, the reaction can proceed spontaneously. The standard free energies of reacting substances involved in the above equation are as follows:

| Substance | $\Delta G^\ominus$ |
|---|---|
| Al | −5609.9 − 11.35T |
| Zr | −8308.6 − 11.23T |
| B | 7754.1 − 6.487T |
| $Al_3Zr$ | −370858.3 + 123.02T |
| $AlB_2$ | −237812.8 + 1162.9T |
| $ZrB_2$ | −242568.7 − 38.617T |

It can be known through further calculations that:

$\Delta G_{(1)}^\ominus = -345720+168.37T$, that is, when T<2053.3K, $\Delta G_{(1)}^\ominus < 0$;

$\Delta G_{(2)}^\ominus = -247711.1+187.944T$, that is, when T<1318K, $\Delta G_{(2)}^\ominus < 0$; and

$\Delta G_{(3)}^\ominus = 263597.3-367.1T$, that is, when T>718.1K, $\Delta G_{(3)}^\ominus < 0$.

It can be known from the above thermodynamic data that the reaction can proceed spontaneously at 718.1 K (445° C.) to 1,318 K (1,045° C.), that is, the reaction can proceed spontaneously in a molten state of welded aluminum alloys (≥660° C.). The reaction product $ZrB_2$ ceramic particles have a nanoscale size, fine grains, and a prominent semi-coherent relationship with Al, where an interface between the two phases is clean and uncontaminated. The production of in-situ $ZrB_2$ particles in a weld can effectively inhibit the growth of dendrites to refine grains, thereby improving the performance of a welded joint. In addition, $ZrB_2$ particles can play a dislocation locking role to prevent a dislocation movement and improve a strength of a welded joint.

When the flux-cored welding wire for high-strength aluminum alloy welding of the present disclosure is used for welding, a 99.99% high-purity Ar gas is used as a protective gas, a weld is excellent and has no defects such as protrusions and undercuts, and properties of a weld metal meet the engineering requirements. The aluminum alloy flux-cored welding wire filled with a mixed salt and a rare earth can be easily fabricated through simple, convenient, efficient, adaptable, and easily-popularized operations at a low cost, which solves problems such as coarse grains, hot crack susceptibility, and joint softening during 7XXX aluminum alloy welding, and has prominent market application values.

Figure 1:
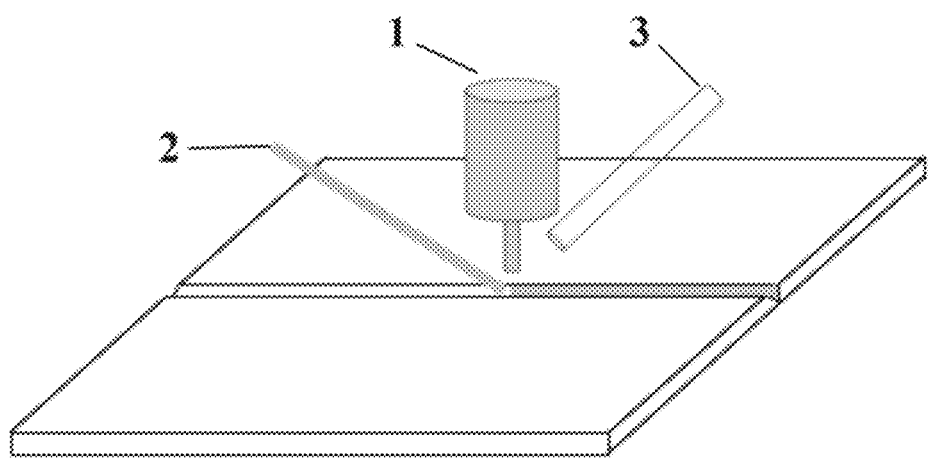
FIG. 1 is a schematic diagram of aluminum alloy welding with the flux-cored welding wire of the present disclosure.
Figure 2:
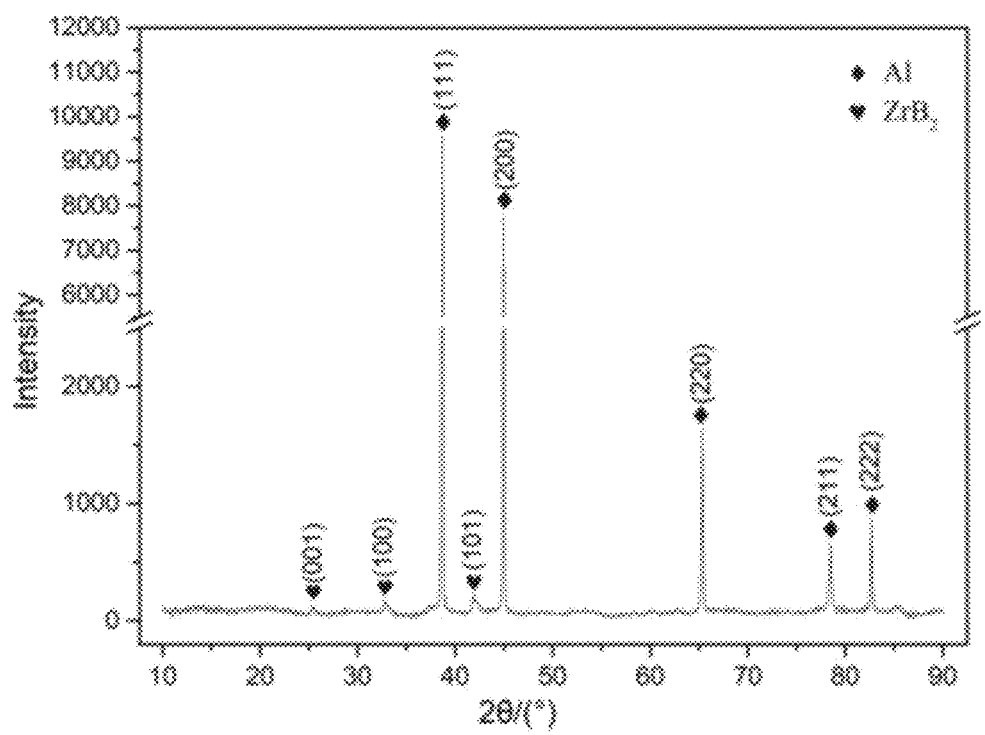
FIG. 2 is an X-ray diffractometry (XRD) pattern of a $ZrB_2$ particle produced under the action of the flux-cored welding wire of the present disclosure.
Figure 3:
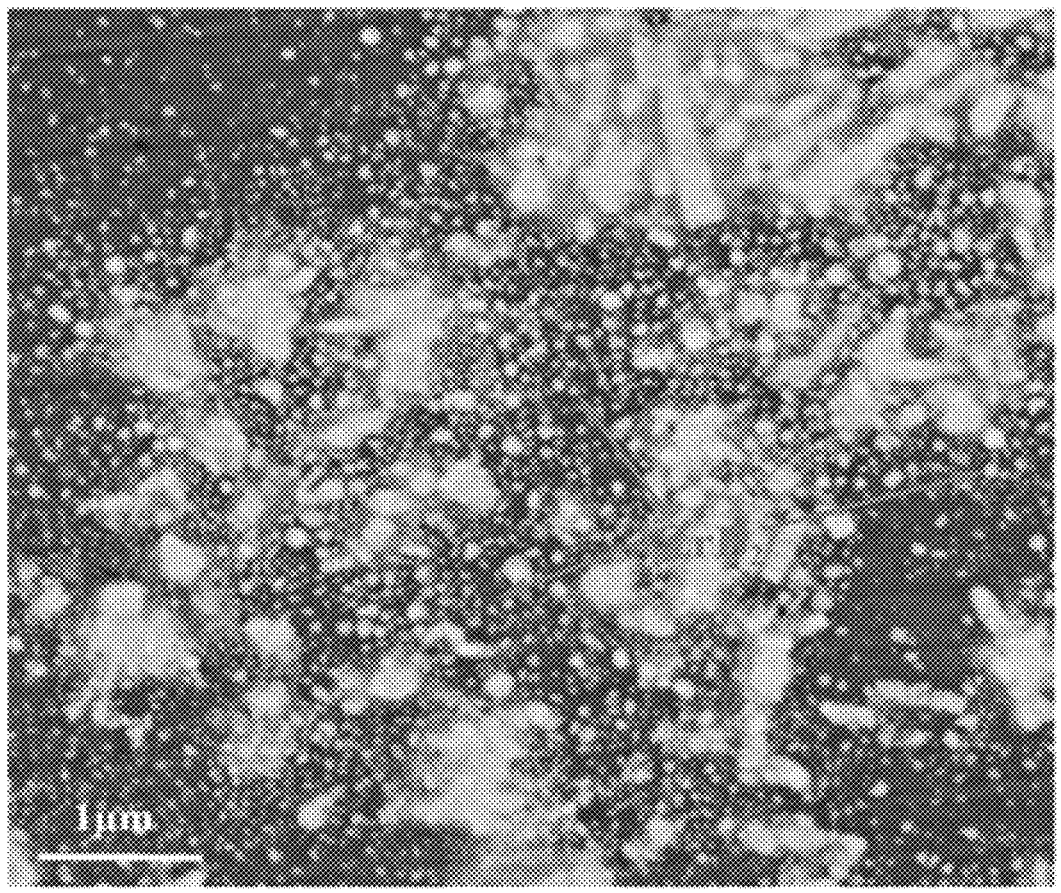
FIG. 3 is a scanning electron microscopy (SEM) image of a $ZrB_2$ particle produced under the action of the flux-cored welding wire of the present disclosure.

In the figures, 1 represents a welding gun, 2 represents a flux-cored welding wire, and 3 represents a protective gas.

DETAILED DESCRIPTION OF THE EMBODIMENTS

To make the objective and technical solutions of the present disclosure clearer and more comprehensible, the present disclosure will be further described in detail below with reference to the examples. It should be understood that the specific examples described herein are intended merely to explain the present disclosure, rather than to limit the present disclosure. In the following examples, a welding wire has a filling rate of 20% to 30%; metal powders include a metal Mg powder, a metal Zn powder, a metal Mn powder, a metal Cu powder, a rare earth (Sc or Er) powder or a (Sc and Zr) or (Er and Zr) mixed powder, and a pure Al powder, which have a particle size of 150 μm to 250 μm; and a mixed salt powder includes $K_2ZrF_6$ and $KBF_4$, both of which are white powders. The above powders are thoroughly mixed mechanically and then oven-dried in a vacuum electric furnace at 200° C. for 2 h.

Table 1 shows that a filled core with an appropriate diameter is selected according to a thickness of a welding base metal.

TABLE 1

| Recommended filled core diameters | | | |
| --- | --- | --- | --- |
| Plate thickness (mm) | 2.0-4.5 | 4.5-7.0 | ≥7.0 |
| Filled core diameter (mm) | 0.8-1.6 | 1.6-2.0 | 2.0-3.0 |

The present disclosure is further described below with reference to specific examples.

Example 1

A flux-cored welding wire filled with a mixed salt and a rare earth for 7085 aluminum alloy welding was provided. A content of a $ZrB_2$ particle was 2%, and a content of a rare earth was 0.5%; and a sheath and a core had the following compositions:

a 1070 pure aluminum strip 10×1.0 mm was used as the sheath, and the filled core had a diameter of 1.0 mm; the filled core had the following chemical composition (weight percentage): metal Zn powder: 7.35%, metal Mg powder: 1.6%, metal Cu powder: 1.4%, metal Mn powder: 0.04%, mixed salt powder: 10%, rare earth powder: 0.5%, and pure aluminum powder: the balance, where a mass ratio of $K_2ZrF_6$ to $KBF_4$ in the mixed salt powder was 0.93, and the rare earth powder was a pure Sc powder; and the welding wire had a filling rate of 20%. When the welding wire was used for welding, 99.99% pure argon was used as a protective gas.

Example 2

A flux-cored welding wire filled with a mixed salt and a rare earth for 7075 aluminum alloy welding was provided. A content of a $ZrB_2$ particle was 3%, and a content of a rare earth was 0.4%; and a sheath and a core had the following compositions:

a 1070 pure aluminum strip 12×1.0 mm was used as the sheath, and the filled core had a diameter of 1.2 mm; the filled core had the following chemical composition (weight percentage): metal Zn powder: 5.5%, metal Mg powder: 2.3%, metal Cu powder: 1.4%, metal Mn powder: 0.3%, mixed salt powder: 15%, rare earth mixed powder (Sc and Zr): 0.4%, and pure aluminum powder: the balance, where a mass ratio of $K_2ZrF_6$ to $KBF_4$ in the mixed salt was 0.94, and the rare earth mixed powder was a mixture of a Sc powder and a Zr powder in a mass ratio of 2:1; and the welding wire had a filling rate of 24%. When the welding wire was used for welding, 99.99% pure argon was used as a protective gas.

Example 3

A flux-cored welding wire filled with a mixed salt and a rare earth for 7001 aluminum alloy welding was provided. A content of a $ZrB_2$ particle was 5%, and a content of a rare earth was 0.6%; and a sheath and a core had the following compositions:

a 1070 pure aluminum strip 12×0.8 mm was used as the sheath, and the filled core had a diameter of 1.6 mm, the filled core had the following chemical composition (weight percentage): metal Zn powder: 7.5%, metal Mg powder: 3.0%, metal Cu powder: 1.8%, metal Mn powder: 0.2%, mixed salt powder: 28%, rare earth mixed powder (Er and Zr): 0.6%, and pure aluminum powder: the balance, where a mass ratio of $K_2ZrF_6$ to $KBF_4$ in the mixed salt was 0.89, and the rare earth mixed powder was a mixture of a Er powder and a Zr powder in a mass ratio of 2:1, and the welding wire had a filling rate of 26% When the welding wire was used for welding. 99.99% pure argon was used as a protective gas.

What is claimed is:

1. An aluminum alloy flux-cored welding wire, comprising a 1070 semi-hard pure aluminum strip as a sheath and having a filling rate of 20% to 30%, that is, comprising a flux powder with a mass of 20% to 30% based on a mass of the aluminum alloy flux-cored welding wire; wherein the flux powder is prepared from the following components in a mass percentage: a metal Zn powder: 4.5% to 8.0%, a metal Mg powder: 1.2% to 3.5%, a metal Cu powder: 0.5% to 2.5%, a metal Mn powder: 0.04% to 0.5%, a mixed salt powder: 5% to 30%, a rare earth powder: 0.1% to 1.0%, and a pure aluminum powder: the balance, based on 100% of a total mass percentage of the flux powder; and the mixed salt powder comprises $K_2ZrF_6$ and $KBF_4$, and a mass ratio of the $K_2ZrF_6$ to the $KBF_4$ is (0.86–1.12):1.

2. The aluminum alloy flux-cored welding wire according to claim 1, wherein the mixed salt powder is ground to 200 mesh before being used.

3. The aluminum alloy flux-cored welding wire according to claim 1, wherein the rare earth powder is Sc, Er, a composite additive of Sc and Zr, or a composite additive of Er and Zr; when Sc and Zr are added in combination, a mass ratio of Sc to Zr is 2:1; when Er and Zr are added in combination, a mass ratio of Er to Zr is 2:1; the rare earth powder has a spherical or nearly-spherical morphology, a high purity, and a particle size of 150 μm to 250 μm; Sc and Er each have a mass purity of 99.9% to 99.99%, and Zr has a mass purity of 99.5% to 99.8%; and Sc, Er, and Zr each have an oxygen content of lower than 50 ppm.

4. The aluminum alloy flux-cored welding wire according to claim 3, wherein when a rare earth Sc powder is added alone, a content of the rare earth Sc powder is 0.4% to 0.7%; when a rare earth Er powder is added alone, a content of the rare earth Er powder is 0.3% to 0.6%; and when Sc and Zr are added in combination or Er and Zr are added in combination, a content of Sc or Er is 0.3%, and a content of Zr is 0.2%.

5. The aluminum alloy flux-cored welding wire according to claim 1, wherein when a rare earth Sc powder is added alone, a content of the rare earth Sc powder is 0.4% to 0.7%; when a rare earth Er powder is added alone, a content of the rare earth Er powder is 0.3% to 0.6%; and when Sc and Zr are added in combination or Er and Zr are added in combination, a content of Sc or Er is 0.3%, and a content of Zr is 0.2%.

6. The aluminum alloy flux-cored welding wire according to claim 1, wherein addition amounts of the metal Zn powder, the metal Mg powder, the metal Cu powder, and the metal Mn powder match a composition of a welding base metal, and the addition amounts vary by the composition of the welding base metal; and in consideration of burning losses of elements, Cu and Mn are added at contents 1.1 to 1.3 times standard Cu and Mn contents in a base metal grade, respectively; and Zn and Mg are added at contents 1.3 to 1.5 times standard Zn and Mg contents in the base metal grade, respectively.

7. The aluminum alloy flux-cored welding wire according to claim 1, wherein a content of the mixed salt powder is 14% to 17%, and the mass ratio of the $K_2ZrF_6$ to the $KBF_4$ is 0.94:1.

8. The aluminum alloy flux-cored welding wire according to claim 1, wherein the metal Zn powder, the metal Mg powder, the metal Cu powder, and the metal Mn powder each are a high-purity metal powder with a mass purity of greater than 99.9%, the high-purity metal powder has a spherical or nearly-spherical morphology, a particle size of 150 μm to 250 μm, and an oxygen content of lower than 50 ppm; and the sheath is a 1070 semi-hard pure aluminum strip with a mass purity of greater than 99.5%.

9. The aluminum alloy flux-cored welding wire according to claim 1, wherein the aluminum alloy flux-cored welding wire is used for 7XXX aluminum alloy welding, wherein the 7XXX aluminum alloy welding comprises tungsten argon arc welding and gas metal arc welding; during the 7XXX aluminum alloy welding, the aluminum alloy flux-cored welding wire is placed in a gap or a groove between two plates to be connected, and high-purity argon with a purity of higher than 99.9% is used as a protective gas; and after the 7XXX aluminum alloy welding, a steel wire brush or a copper wire brush is used to remove a welding spatter on a surface.

10. A fabrication method of the aluminum alloy flux-cored welding wire according to claim 1, comprising: selecting the 1070 semi-hard pure aluminum strip with a width of 10 mm to 16 mm and a thickness of 0.6 mm to 1.0 mm as the sheath for a filling wire, removing an oxide film on an upper surface of the 1070 semi-hard pure aluminum strip with a scraper, and rolling the 1070 semi-hard pure aluminum strip into a U-shaped channel, and filling the flux powder into the U-shaped channel, closing the U-shaped channel, passing the product through drawing dies with different diameters successively for multi-drawing and tube reducing, and cleaning a surface of a resulting welding wire to obtain a finished welding wire product with a diameter of 0.8 mm to 3.0 mm, wherein a weight of the flux powder is 20% to 30% of a weight of the resulting welding wire.

* * * * *